United States Patent
Ullrich (10) Patent No.: US 10,311,686 B2
(45) Date of Patent: Jun. 4, 2019

(54) AUTOMATIC AND UNIQUE HAPTIC NOTIFICATION

(71) Applicant: IMMERSION CORPORATION, San Jose, CA (US)

(72) Inventor: Christopher Ullrich, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 60 days.

(21) Appl. No.: 14/978,160

(22) Filed: Dec. 22, 2015

(65) Prior Publication Data

US 2016/0180661 A1 Jun. 23, 2016

Related U.S. Application Data (60) Provisional application No. 62/096,295, filed on Dec. 23, 2014.

(51) Int. Cl.
*G08B 6/00* (2006.01)
*H04M 19/04* (2006.01)

(52) U.S. Cl.
CPC ............ *G08B 6/00* (2013.01); *H04M 19/047* (2013.01)

(58) Field of Classification Search
CPC ........ G06F 3/016; G06F 17/30097–17/30448; H04M 1/575; H04M 1/72544; H04M 1/72547; H04M 19/047; H04M 1/72572; G08B 6/00
See application file for complete search history.

(56) References Cited

U.S. PATENT DOCUMENTS

| | | | |
|---|---|---|---|
| 8,860,563 B2 | 10/2014 | Cruz-Hernandez et al. | |
| 9,495,011 B1 * | 11/2016 | Lee | G06F 3/016 |
| 9,520,036 B1 * | 12/2016 | Buuck | G08B 6/00 |
| 2006/0066569 A1 | 3/2006 | Eid et al. | |
| 2006/0136630 A1 * | 6/2006 | Eid | G06F 3/016 |
| | | | 710/72 |

(Continued)

FOREIGN PATENT DOCUMENTS

| | | |
|---|---|---|
| EP | 2141569 | 1/2010 |
| EP | 2674835 A2 | 12/2013 |
| WO | 2013/085834 | 6/2013 |

OTHER PUBLICATIONS

European Search Report for EP Application No. EP 15 20 2166, dated Apr. 22, 2016, 7 pages.

*Primary Examiner* — Orlando Bousono
(74) *Attorney, Agent, or Firm* — Miles & Stockbridge P.C.

(57) ABSTRACT

Disclosed herein is an apparatus for automatically generating unique haptic effects. An embodiment of the apparatus comprises a haptic actuator. Memory stores a hash function and a haptic control module programmed to generate a haptic control signal related to a hash value generated by the hash function. A controller is communicatively associated with the haptic actuator and the memory. The controller is configured to receive information, execute the hash function on at least a portion of the information to generate the hash value, generate a haptic signal related to the hash value, and control the haptic actuator to generate a haptic effect, the haptic effect related to the hash value and the haptic signal. A method of automatically generating a unique haptic effect also is disclosed.

18 Claims, 8 Drawing Sheets

(56) References Cited

U.S. PATENT DOCUMENTS

| | | | |
|---|---|---|---|
| 2006/0288137 A1* | 12/2006 | Grant | G06F 3/016 710/62 |
| 2007/0005835 A1* | 1/2007 | Grant | G06F 3/016 710/62 |
| 2007/0057913 A1* | 3/2007 | Eid | G06F 3/016 345/156 |
| 2008/0133648 A1* | 6/2008 | Grant | G06F 3/016 709/203 |
| 2009/0021473 A1* | 1/2009 | Grant | G06F 3/016 345/156 |
| 2013/0335209 A1* | 12/2013 | Cruz-Hernandez | G06F 3/016 340/407.1 |
| 2014/0092003 A1* | 4/2014 | Liu | G06F 3/016 345/156 |
| 2014/0176415 A1* | 6/2014 | Buuck | G06F 3/016 345/156 |

* cited by examiner

AUTOMATIC AND UNIQUE HAPTIC NOTIFICATION

CROSS REFERENCE TO CO-PENDING APPLICATION

This document is a utility patent application claiming priority to U.S. Provisional Application Ser. No. 62/096,295, filed on Dec. 23, 2014, entitled AUTOMATIC UNIQUE NOTIFICATION SYSTEM, the entire disclosure of which is incorporated by reference.

TECHNICAL FIELD

This patent document relates to haptic effects and more particularly to automatic and unique haptic notifications.

BACKGROUND

Customized haptic alerts are highly valued by users because they enable attentional decisions without requiring the distraction of visual review of a user interface or device. Most users use the default setting of haptic effect notifications on the device, but these default settings rely on simple patterns and do not provide a very broad set of vibration patters, and they are often difficult to distinguish from one another. Additionally, each new contact or application requires a user to update the mapping for haptic effects, which can be burdensome for users who have a significant number of contacts, transient contacts, or projects or applications that have a volatile content. Assigning unique haptic notification is these situations is tedious and thus many users do not take advantage of them. While these problems sometimes can be tolerated with smartphone because a user typically can give their phone visual attention, they can be a particular issue with devices that do not have graphical user interfaces such as game controllers, wearable device that are not readily accessible for visual review, and other types of devices that are enabled with haptics.

SUMMARY

One aspect of this patent document is a haptic-enabled apparatus comprising a haptic actuator. Memory stores a hash function and a haptic control module programmed to generate a haptic control signal related to a hash value generated by the hash function. A controller is communicatively associated with the haptic actuator and the memory. The controller is configured to receive information, execute the hash function on at least a portion of the information to generate the hash value, generate a haptic signal related to the hash value, and control the haptic actuator to generate a haptic effect, the haptic effect related to the hash value and the haptic signal.

In another aspect, a haptic-enabled apparatus comprises a haptic actuator. Memory stores a predetermined item of information and a predetermined digital waveform. A controller is communicatively associated with the haptic actuator and the memory. The controller is configured to receive information, determine whether the received information comprises the predetermined item of information, and automatically synthesize the predetermined item of information with the predetermined digital waveform to form a synthesized haptic signal, convert the synthesized haptic signal to an analog drive signal, and communicate the analog drive signal to the haptic actuator.

Yet another aspect of this patent document is a method of automatically generating a haptic effect in a programmable apparatus, the programmable apparatus comprising a haptic actuator and a controller. The method comprises: receiving information in the controller; executing a hash function on at least a portion of the information to generate a hash value; identifying haptic data associated with the hash value; generating a drive signal, the drive signal being generated based at least in part on the haptic data; applying the drive signal to the actuator; and generating a haptic effect, the haptic effect being associated with the haptic data, the hash value, and the information.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. Use of the terms "or" and "and" means "and/or" unless stated otherwise or otherwise clear from the context of the related language. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

In general terms this patent document related to automatic generation of haptic effects based on information received by a haptic-enabled device or other device in communication with a haptic-enabled device. A haptic effect can be any type tactile sensation delivered to a person. The haptic effect embodies a message such as a cue, notification, or more complex information.

In at least some embodiments, a hash function is executed on the received information, or at least a portion of the receive information, to generate a hash value. The hash value is then used to generate a unique haptic effect. In other embodiments, the information or at least a portion of the information is synthesized with a waveform to form a synthesized signal. The synthesized signal is used in generating and delivering a unique haptic effect. Other embodiments use a combination of a hash value and signal synthesis to generate the unique haptic effect.

Figure 1:
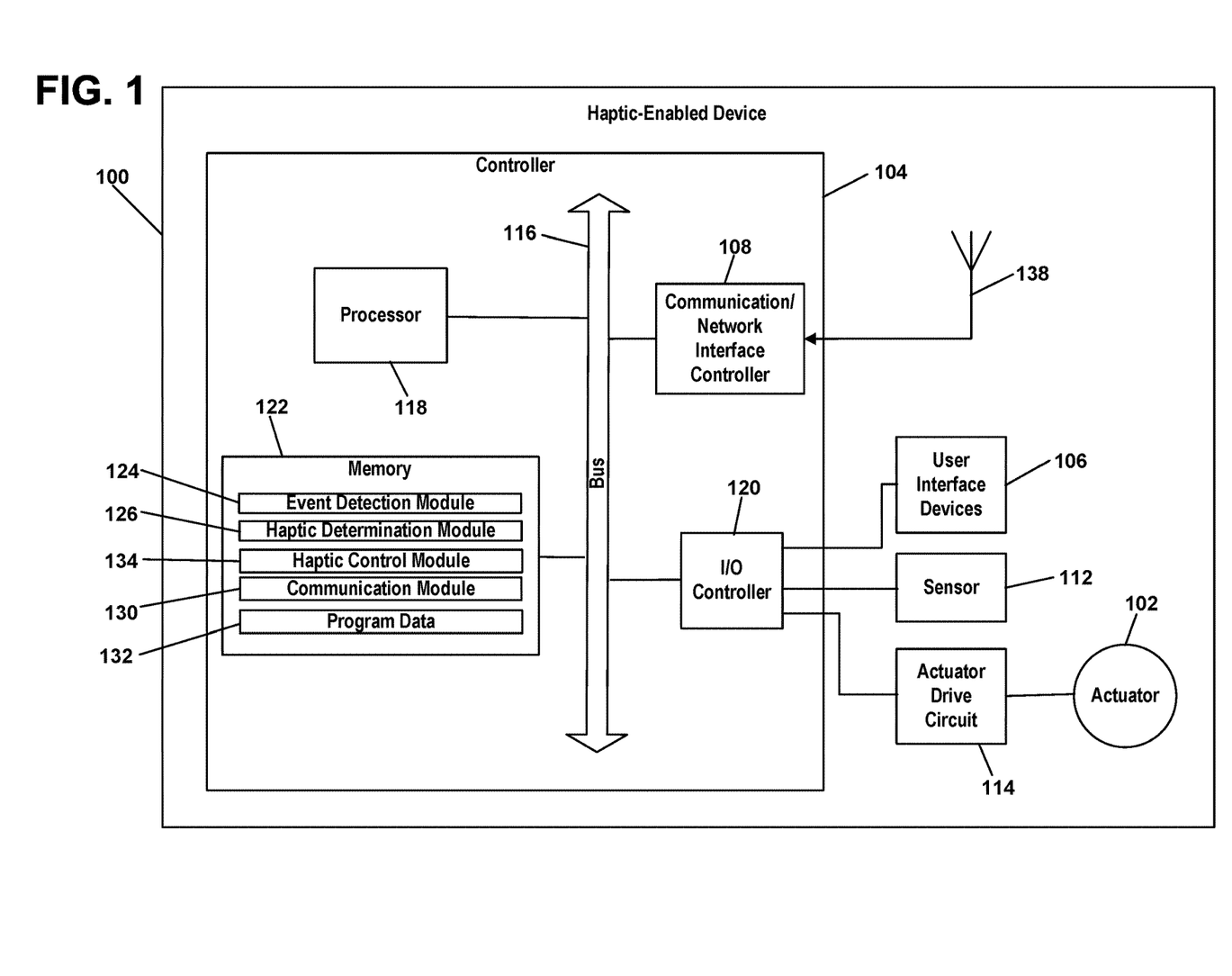
FIG. 1 is a block diagram illustrating an embodiment of an apparatus that automatically generates unique haptic effects based on information.

Referring now to FIG. 1, at least one embodiment of a haptic-enabled device 100 includes a haptic actuator 102, controller 104, user interface devices 106, sensor 1112, actuator drive circuit 114, and antenna 138.

The haptic actuator 102 can be any device that produces a motion. Examples of actuators include mechanisms such as motors; an eccentric rotating mass ("ERM") in which an eccentric mass is moved by a motor; linear actuators such as solenoids, linear motor, or linear resonant actuator ("LRA") in which a mass attached to a spring is driven back and forth; magnetic or electromagnetic mechanisms; and smart materials such as shape memory alloys, piezoelectric materials, electroactive polymers, and materials containing smart fluids; a macro-fiber composite actuator; electro-static actuator; an electro-tactile actuator; or anothe type of actuator that provides a physical feedback such as a haptic feedback. Haptic output devices also can include non-mechanical or non-vibratory devices such as ultrasonic surface friction (USF) or those that use electrostatic friction (ESF), induce acoustic radiation pressure with an ultrasonic haptic transducer; use a haptic substrate and a flexible or deformable surface; and provide projected haptic output such as an ultrasonic feedback, a puff of air using an air jet.

User interface devices 106 include any device or mechanism through which a user can view information, or input commands or other information into the haptic-enabled device 100. Examples of user interface devices 106 include touchscreens, cameras, mechanical inputs such as buttons and switches, and other types of input components.

The sensor 112 can be any instrument or other device that outputs a signal in response to receiving a stimulus. The sensor 112 can be hardwired to the controller 104 or can be connected to the controller 104 wirelessly. The sensor 112 can be used to detect or sense a variety of different conditions, events, and things such as environmental conditions, the presence of other people or objects, biometric parameters or other information, medical parameters such as heart rate, blood pressure, blood glucose levels, and other vital signs and medical parameters.

Examples of sensors 112 include acoustical or sound sensors such as microphones; vibration sensors; chemical and particle sensors such as breathalyzers, carbon monoxide and carbon dioxide sensors, and Geiger counters; electrical and magnetic sensors such as voltage detectors or hall-effect sensors; flow sensors; navigational sensors or instruments such as GPS receivers, altimeters, gyroscopes, or accelerometers; position, proximity, and movement-related sensors such as piezoelectric materials, rangefinders, odometers, speedometers, shock detectors; imaging and other optical sensors such as charge-coupled devices (CCD), CMOS sensors, infrared sensors, and photodetectors; pressure sensors such as barometers, piezometers, and tactile sensors; force sensors such as piezoelectric sensors and strain gauges; temperature and heat sensors such as thermometers, calorimeters, thermistors, thermocouples, and pyrometers; proximity and presence sensors such as motion detectors, triangulation sensors, radars, photo cells, sonars, and hall-effect sensors; biochips; biometric sensors such as blood pressure sensors, pulse/ox sensors, blood glucose sensors, and heart monitors. Additionally, the sensors 112 can be formed with smart materials, such as piezo-electric polymers, which in some embodiments function as both a sensor and an actuator.

The controller 104 comprises a bus 116, processor 118, input/output (I/O) controller 120, memory 122, and a communication/network interface controller (NIC) 108. The bus 116 includes conductors or transmission lines for providing a path to transfer data between the components in the controller 104 including the processor 118, memory 122, and I/O controller 120. The bus 116 typically comprises a control bus, address bus, and data bus. However, the bus 116 can be any bus or combination of busses suitable to transfer data between components in the controller 104.

The I/O controller 120 is circuitry that monitors operation of the controller 104 and peripheral or external devices such as the user interface devices 106, sensor 112, and actuator drive circuit 114. The I/O controller 120 also manages data flow between the controller 104 and the peripheral devices and frees the processor 118 from details associated with monitoring and controlling the peripheral devices. Examples of other peripheral or external devices with which the I/O controller 120 can interface includes external storage devices; monitors; input devices such as keyboards, pointing devices; external computing devices; antennas; other articles worn by a person; and any other remote devices 110.

The NIC 108 provides an interface between the controller 104 and the antenna 138, which provides wireless communication between the controller 104 and remote devices 110. Wireless communication can be according to any wireless transmission techniques including standards such as Bluetooth, cellular standards (e.g., CDMA, GPRS, GSM, 2.5G, 3G, 3.5G, 4G), WiGig, IEEE 802.11a/b/g/n/ac, IEEE 802.16 (e.g., WiMax). The NIC 108 also can provide wired communication between the controller 104 and remote devices 110 through wired connections using any suitable port and connector for transmitting data and according to any suitable standards such as RS 232, USB, FireWire, Ethernet, MIDI, eSATA, or thunderbolt.

The processor 118 can be any circuit configured to process information and can include any suitable analog or digital circuit. The processor 118 also can include a programmable circuit that executes instructions. Examples of programmable circuits include microprocessors, microcontrollers, application specific integrated circuits (ASIC), programmable gate arrays (PLA), field programmable gate arrays (FPGA), or any other processor or hardware suitable for executing instructions. In various embodiments, the processor 118 can be a single unit or a combination of two or more units. If the processor 118 includes two or more units, the units can be physically located in a single controller or in separate devices.

The memory 122 can include volatile memory such as random access memory (RAM), read only memory (ROM), electrically erasable programmable read only memory (EPROM), flash memory, magnetic memory, optical memory, or any other suitable memory technology. The memory 122 also can include a combination of volatile and nonvolatile memory. The memory 122 can store a number of program modules for execution by the processor 118, including an event detection module 124, a haptic determination module 126, a communication module 130, a haptic control module 134, and any other programmable module used in the operation of a haptic-enable device. Each module is a collection of data, routines, objects, calls, and other instructions that perform one or more particular tasks. Although certain modules are disclosed herein, the various instructions and tasks described herein can be performed by a single module, different combinations of modules, modules other than those disclosed herein, or modules executed by remote devices 110 that are in communication with the haptic-enabled device 100 and controller 104. The memory 122 also stored program data 132, which can be any predetermined information, data, program code, waveforms, signals, and other information used in automatically generating a unique haptic effect or otherwise operating the haptic-enabled device 100.

The event detection module 124 is programmed to receive formation, which in various embodiments can be received from a remote device 110 through the NIC 108, from the sensor, or from the user input devices. The information also can include information that is generated by the processes executed by controller 104 such as alarms or warnings. The event detection module 124 determines whether the received information generally corresponds to haptic effects.

Information for which a haptic effect should be automatically generated is stored in memory 122 as predetermined information and can include any type of information. Examples of such information can include telephone numbers, e-mail addresses, metadata, names, sensor signals, alarms, threshold values, times, certain words within the body of a message, a device identifier (e.g., a media access control ("MAC") address and/or identifier that can identify the device), a network address (e.g., Uniform Resource Locator or other network address), and other identifiers and information. Additionally, the predetermined items of information can have different lengths of character strings, which enable the haptic-enabled device 100 to process any type of predetermined information that it might receive.

The event detection module 124 compares the received information with the predetermined information stored in memory 122. The event detection module 124 can include and use any suitable algorithm to compare the received information to the predetermined information. Examples of such an algorithm include sequence algorithms. In another possible method of comparison, the event detection module 124 will parse the received information into its components or data items and then compare each of the parsed data items to the predetermined information. Another alternative embodiment defines classes of information and stores those classes in memory 122. In these embodiments, the event detection module 124 determines whether the received information is within a defined classes of information. Examples of classes that can be used to categorize received information include e-mail addresses, telephone numbers, metadata, names, sensor signals, alarms, threshold values, times, certain words within the body of a message, a device identifier, a network address, and other types of information. Embodiments that use classes of information to determine whether a haptic effect should be generated may not store specific items of predetermined information such as specific telephone numbers, In another alternative embodiment, when a predetermined type of information is received, the event detection module 124 automatically compares it to the predetermined information stored in memory 122. If the haptic-enabled device 100 is a phone, for example, the event detection module 124 might automatically compare the telephone number or contact name for every incoming telephone call to a list of predetermined telephone numbers or contact names, respectively, stored in memory 122 to determine if there is a match.

Upon determining the received information matches the predetermined information stored in memory 122 or falls within a predefined class of information, the event detection module 124 communicates the predetermined information to the haptic determination module 126.

In various embodiments, the haptic determination module 126 generates haptic data or a haptic signal related to the predetermined information that is identified by the event detection module 124.

For example, the haptic determination module 126 executes a hash function on the predetermined information to gene hash value. The haptic determination module 126 can use any suitable hash function to generate the hash value. In at least some embodiments, the hash function will generate a hash value having the same number of digits or within a certain range of values regardless of how long the characters string is for the predetermined information being hashed.

The hash value is mapped to a corresponding set of haptic data using a look-up table or other suitable mapping scheme. The mapped set of haptic data is then communicated to the haptic control module 134, which generates a haptic signal. The sets of haptic data define parameters used to generate a haptic drive signal. Examples of parameters that can be defined by the haptic data includes frequency, amplitude, phase, inversion, duration, waveform, attack time, rise time, fade time, and lag or lead time relative to an event. Additionally, the haptic determination module 126 can use any suitable collision avoidance process in the event that two predetermined items of information result in the same hash value when processed by the hash function. Alternatively, if there is a collision, the haptic-enabled device 100 can prompt the user to select a unique haptic effect for each colliding item of predetermined information and then store the selected haptic data and map it to the colliding predetermined items of information.

In at least some alternative embodiments, the haptic determination module 126 will synthesize data representing the hash value with one or more waveforms to generate the synthesized signal, which is further processed by the haptic control module 134. In these alternative embodiments, the memory 122 does not map the hash value to a predetermined set of haptic data. In other example embodiments, the haptic determination module 126 automatically generates a haptic signal without using a hash function, hash value, or a table of predefined haptic data. For example, the haptic determination module 126 uses the digital data corresponding to the non-hashed predetermined information and synthesizes it with one or more waveforms to form a synthesized signal. The synthesized signal is further processed by the haptic control module 134. Generation of the haptic signal using hash values and synthesis is discussed in more detail herein. The waveforms used for synthesizing the haptic data or non-hashed predetermined information can be predetermined and stored in memory 122. Alternatively, the haptic-enabled device 100 can include an oscillator for generating the waveforms during the synthesis process.

The haptic control module 134 receives the haptic data or synthesized signal, processes it into a haptic signal, and then communicates the haptic signal to the actuator drive circuit 114 for generation of a drive signal to be delivered to the haptic actuator 102.

In alternative embodiments, the haptic control module 134 also can include rules that further control and define haptic effects. Examples include rules defining when a haptic effect should or should not be delivered whether the rule is based on time, location, or some other criteria. In other examples, the rules define signal parameters such as frequency, amplitude, phase, inversion, duration, waveform, tack time, rise time, fade time, and lag or lead time relative to an event, and these signal parameters may depend on time, location, or some other criteria.

The communication module 130 controls and facilitates communication between the controller 104 and remote devices 110 through the NIC 108, including processing data embodied in signals received through the antenna 138 or a network port, and preparing data to be transmitted to remote devices 110 through the antenna 138 or a network port. Examples of remote devices 110 include computing devices and sensors. Examples of computing devices include servers, desktop computers, laptop computers, hybrid computers, tablets, smartphones, wearable devices such as smart watches or smart clothing, home automation computers and controllers, smart appliances, game counsels and controllers, and any other device that is programmable. The communication can take any form suitable for data communication including communication over wireless or wired communication signals or data paths.

Alternative embodiments of the program modules are possible. For example, some alternative embodiments might have more or fewer program modules than the event detection module 124, haptic determination module 126, haptic control module 134, and communication module 130. Additionally, the functionality disclosed herein can be programmed into one or more program modules different than the program modules disclosed herein.

The actuator drive circuit 114 is a circuit that receives a haptic signal from the controller 104. The actuator drive circuit 114 includes a digital-to-analog circuit to convert the haptic signal from a digital signal to an analog signal for communication or application to the haptic actuator 102. The actuator drive circuit 114 also includes amplifiers, filters, and any other circuitry necessary to condition the drive signal and apply it to the haptic actuator 102.

Figure 2:
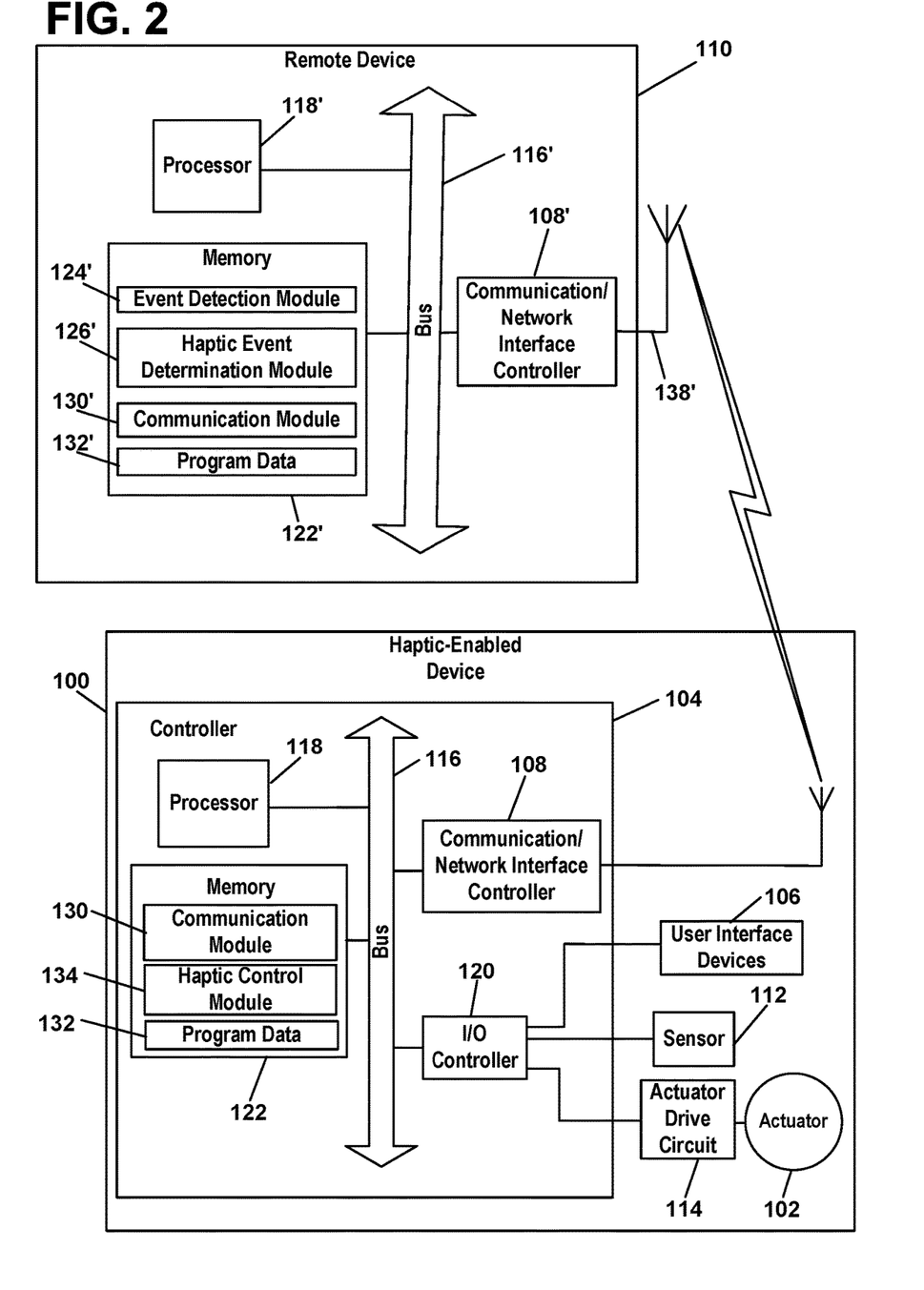
FIG. 2 is a block diagram illustrating the apparatus illustrated in FIG. 1 communicatively coupled or associated with an embodiment of a remote device.

FIG. 2 illustrates an alternative embodiment in which the haptic-enable device 100 communicates with a remote device 110 to process information and generate haptic data or a haptic signal. In this embodiment the haptic-enabled device 100 is paired with or otherwise communicates with a remote device 110. Examples of haptic-enabled devices 100 and remote devices 110 that can be paired or otherwise cooperate as disclosed herein include a wearable device such as a smart watch, smart clothing, or wearable monitor (i.e., haptic-enabled device) and a smart phone (i.e., remote device); a smart phone (i.e., haptic-enabled device) and a server (i.e., remote device); a game controller (i.e., haptic-enabled device) and a game counsel (i.e., remote device); a computer such as a desktop, laptop, tablet, or hybrid computer (i.e., haptic-enabled device) and a server (i.e., remote device); a smart phone (i.e., haptic-enabled device) and a home automation computer (i.e., remote device); or any other combinations of haptic-enabled devices and remote device.

In this embodiment, the remote device 110 is substantially similar to the haptic-enabled device 100 and includes a bus 116', NIC 108', processor 118', and memory 122'. In various embodiments, the remote device 110 also can include user interfaces, I/O controllers 120', sensors 112', haptic actuators 102', actuator drive circuits 114', network ports, or any other hardware or software. The remote device 110 also can be haptically enabled.

In at least some embodiments as illustrated in FIG. 2, one or more of the program modules are stored in memory 122' for the remote device 110 and executed by the processor 118' in the remote device 110. For example, the event detection module 124', haptic determination module 126', and communication module 130' can be loaded in and executed by the remote device 110. The memory 122' also stores any required program data 132', which can include the data and program modules required for processing received information and generating a haptic effect can be stored in memory 122' for the remote device 110. Examples include the predetermined information event detection module 124', haptic determination module 126', waveforms used for synthesis of the haptic data, and combination thereof. In such an embodiment, the remote device 110 can receive information, which might be relayed from an initial receiving device such as a smartphone, and determine whether the received information includes predetermined information related to haptics. If the received information does include predetermined information, the remote device 110 can then generate or recall from memory 122' information, data, or signals such as instructions, haptic data or other data, a haptic signal, a synthesized signal, or other signals. The remote device 110 then communicates information or data to the haptic-enabled device 100 for further processing and generation of a haptic effect.

An example application for this embodiment is a smartphone that is linked to a smart watch through a Bluetooth communication link. The smartphone receives a telephone call and then maps the telephone number associated with the received call, determines that telephone number is in the list of predetermined information, generates the haptic data, and communicates the haptic data to the smart phone to generate and deliver a haptic effect to the user. In another example, the remote device 110 is a server such as a Facebook server and the haptic-enabled device 100 is a smartphone or other computer being used to browse Facebook postings. If the user scrolls through their Facebook interface, the event detection module 124' continually evaluates information as it is brought into the viewable user interface. If predetermined information is brought into view on the user interface, the haptic determination module 126' generates haptic data or a haptic signal and communicates that haptic data or haptic signal to the haptic-enabled device 100 to generate and deliver a haptic effect to the user.

In other embodiments, the functionality of the event detection module 124, haptic determination module 126, and haptic control module 134 are divided between a server, the haptic-enabled device 100 such as a smart watch, and a smart phone that provides an interface, and possibly some haptic processing functionality, between the server and the haptic-enabled device 100.

In yet other embodiments, the haptic-enabled device 100 is a "dumb" device in the sense that it comprises a haptic actuator 102, drive electronics, and a wired or wireless network interface, but does not include an event detection module 124 or a haptic determination module 126. In such an embodiment, the remote device 110 performs the haptic processing, generates a motor control signal, and then communicates to the haptic-enabled device 100 the motor control signal or parameters to generate the motor control signals. The haptic-enabled device then applies the motor control signal to the haptic actuator 102 to generate the haptic effect. An example of such an embodiment is a game controller that is in communication with a gaming counsel such as an Xbox® gaming counsel available from Microsoft Corporation or a PlayStation® game counsel available from Sony Corporation. In this embodiment, the game controller is the remote device 110 and the gaming counsel is the remote device 110.

Figure 3:
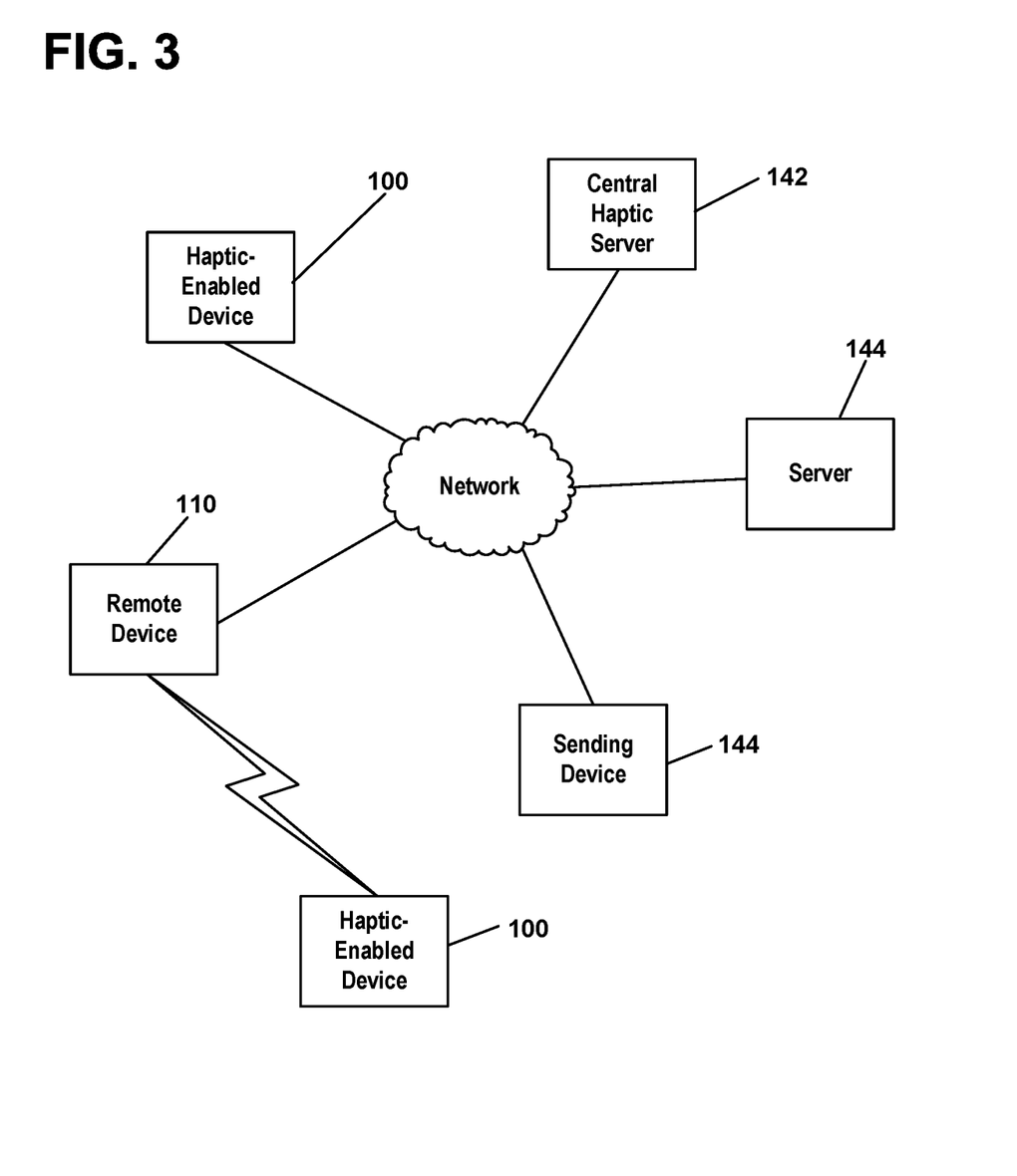
FIG. 3 is a block diagram illustrating an embodiment of a networked environment in which the apparatuses of FIG. 1 and FIG. 2 can operate

FIG. 3 illustrates an example environment in which haptic-enabled devices 100 are networked with remote devices 110. In this illustration, a network 128 can be any suitable network such as a public network, private network, local-area network, wide-area network such as the Internet, telephone network, or some combination thereof. In various embodiments, a receiving device 136 is a device that receives information, data, or signals over the network 128. Examples of receiving devices include haptic-enabled device 100 such as smartphones, wearable devices having a network connection, game consoles, and computers. Alternatively, the receiving device can be a remote device 110, regardless of whether it is haptic-enabled, that receives the information and then communicates instructions, information, data, or a signal related to the information to another haptic-enabled device 100 for delivering a haptic effect.

A sending device 140 can be any device capable of communicating information that may trigger a haptic effect. Examples of sending devices include phones, computers, game consoles, and servers 144. Servers 144 can include any type of server that can store, process, and send information such as information servers, social media servers, and home-automation controllers/servers.

Additionally, the server 144 can be a central haptic server 142 that stores predefined information, hash functions, haptic data, tables mapping hash values to sets of haptic data, waveforms to use for synthesizing hash values or predetermined information, and other information, instructions, program modules, data, or signals. In these embodiments, haptic-enabled device 100 or the remote device 110 that is executing the event detection module 124, haptic determination module 126, haptic control module 134 can be programmed to reference the central haptic server to download information, data, program updates, hash functions, waveforms, and signals. In another example, the central haptic server can maintain a central list of predetermined information that can be downloaded to the haptic-enabled device 100 or other remote device 110 that processes received information to determine whether to generate a haptic signal and effect.

Figure 4:
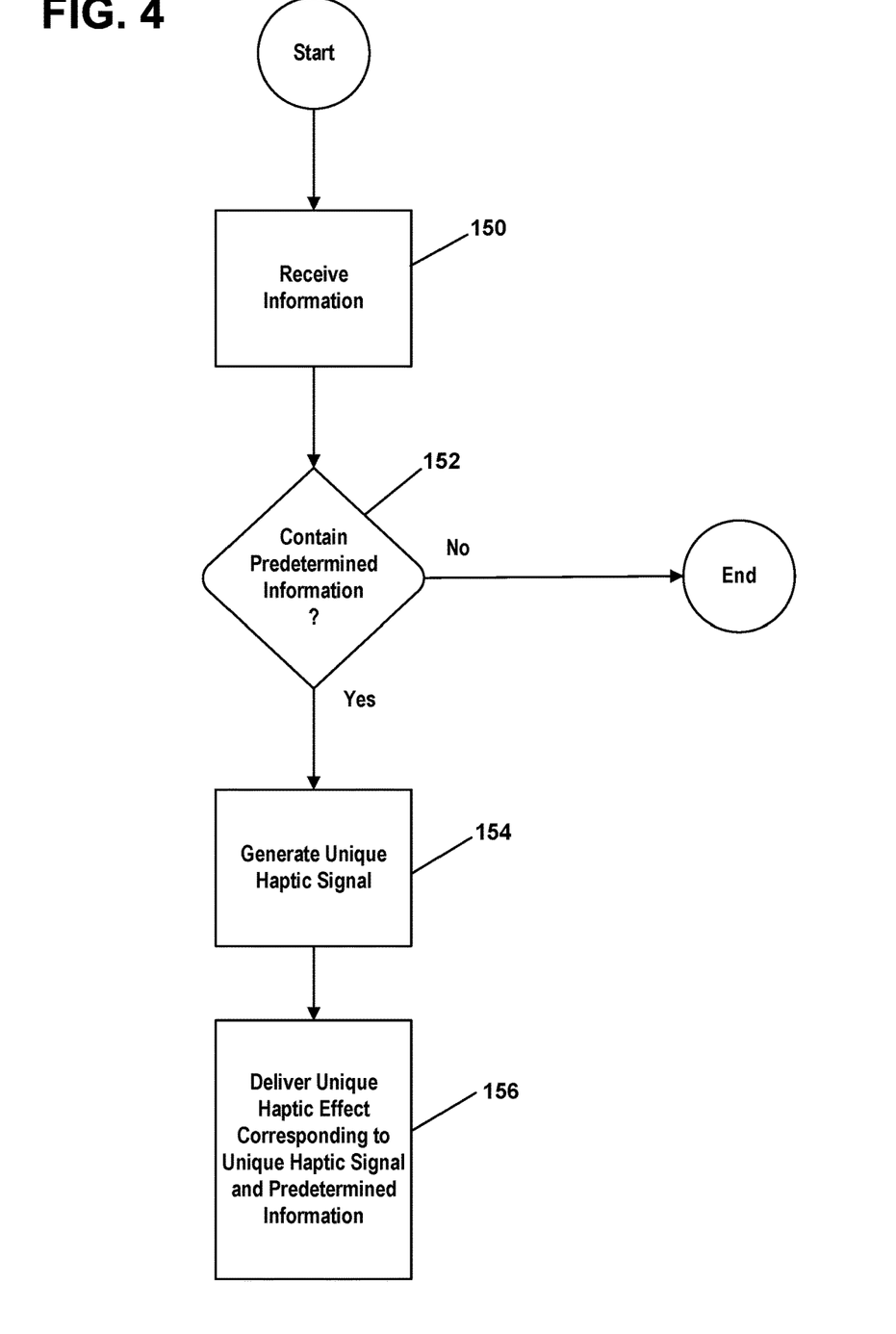
FIGS. 4-8 are flow charts illustrating the process of automatically generating unique haptic effects.

FIG. 4 broadly illustrates the process for automatically generating a haptic effect when a haptic-enabled device 100 receives information. At operation 150, the haptic-enabled device 100 receives information. The received information is then processed to determine whether it contains predetermined information corresponding to haptic effects. Operation 152. If the received information contains predetermined information, the predetermined information is processed to generate a unique haptic signal associated with a unique haptic effect. Operation 152. The haptic actuator 102 then delivers the unique haptic effect. Operation 154. If the received information does not contain any predetermined information, no action is taken and the process ends. At least some embodiments of this process generate the haptic signal in real time or near real-time upon receiving the information. In these embodiments, there is no perceivable delay to user between the haptic-enabled device 100 receiving the information and the haptic-enabled device generating the haptic signal. Additionally, this process generates a unique haptic effect for each item of predetermined information. Furthermore, the haptic enabled device 100 can provide unique haptic effects by varying parameters and waveforms used to generate the haptic signals to enough of an extent that a typical user can readily distinguish between different haptic effects corresponding to different items of predetermined information.

Rather than comparing the received information to specific predetermined items of information, alternative embodiments determine whether the received information, or at least a portion of the received information, falls within a predetermined class of information. If the received information falls within the predetermined class of information, the received information falling within the predetermined class is used to generate a unique haptic effect signal associated with a unique haptic effect as disclosed herein. Operation 152. The haptic actuator 102 then delivers the unique haptic effect. Operation 154.

Figure 5:
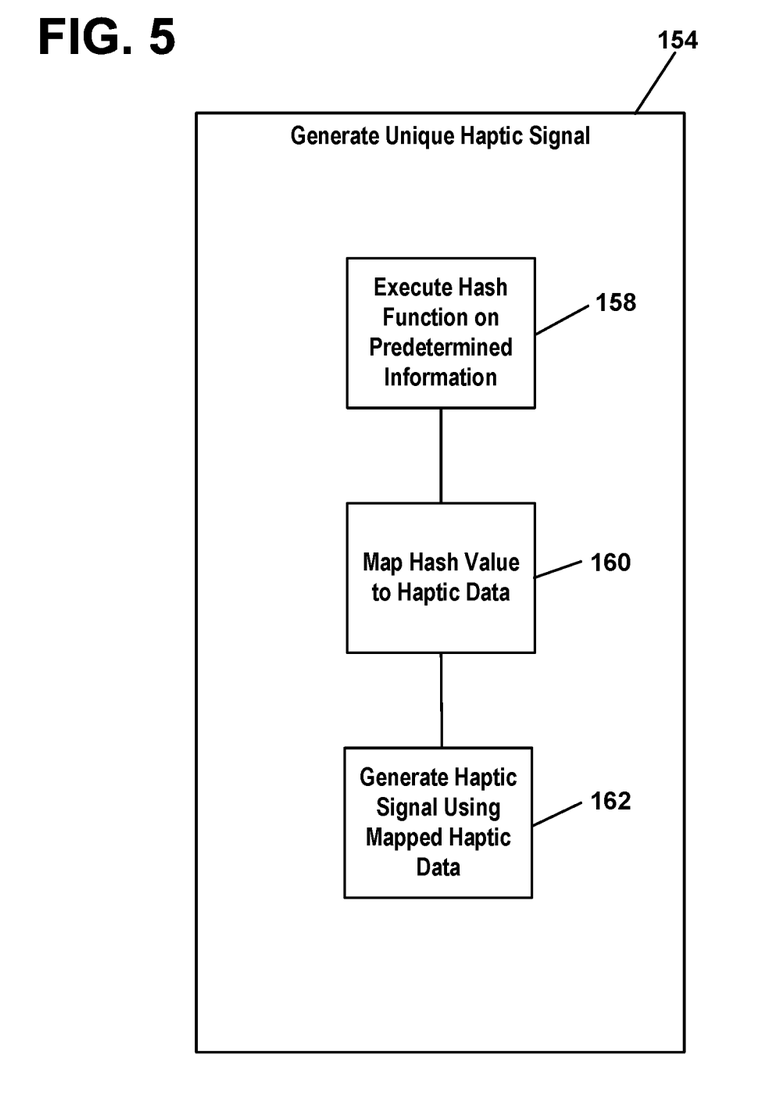

FIG. 5 illustrates a possible embodiment of Operation 154 for processing the predetermined information to generate a unique haptic signal. In this embodiment, a hash function is executed on the predetermined information to generate a hash value. Operation 158. The hash value is then mapped to a unique set of haptic data. Operation 160. The mapped unique set of haptic data is then processed to generate a haptic signal. Operation 162. The haptic signal is communicated to the actuator drive circuit 114 to generate a drive signal, which is applied to the haptic actuator 102. The haptic actuator 102 generated the haptic effect. Operation 156.

Figure 6:
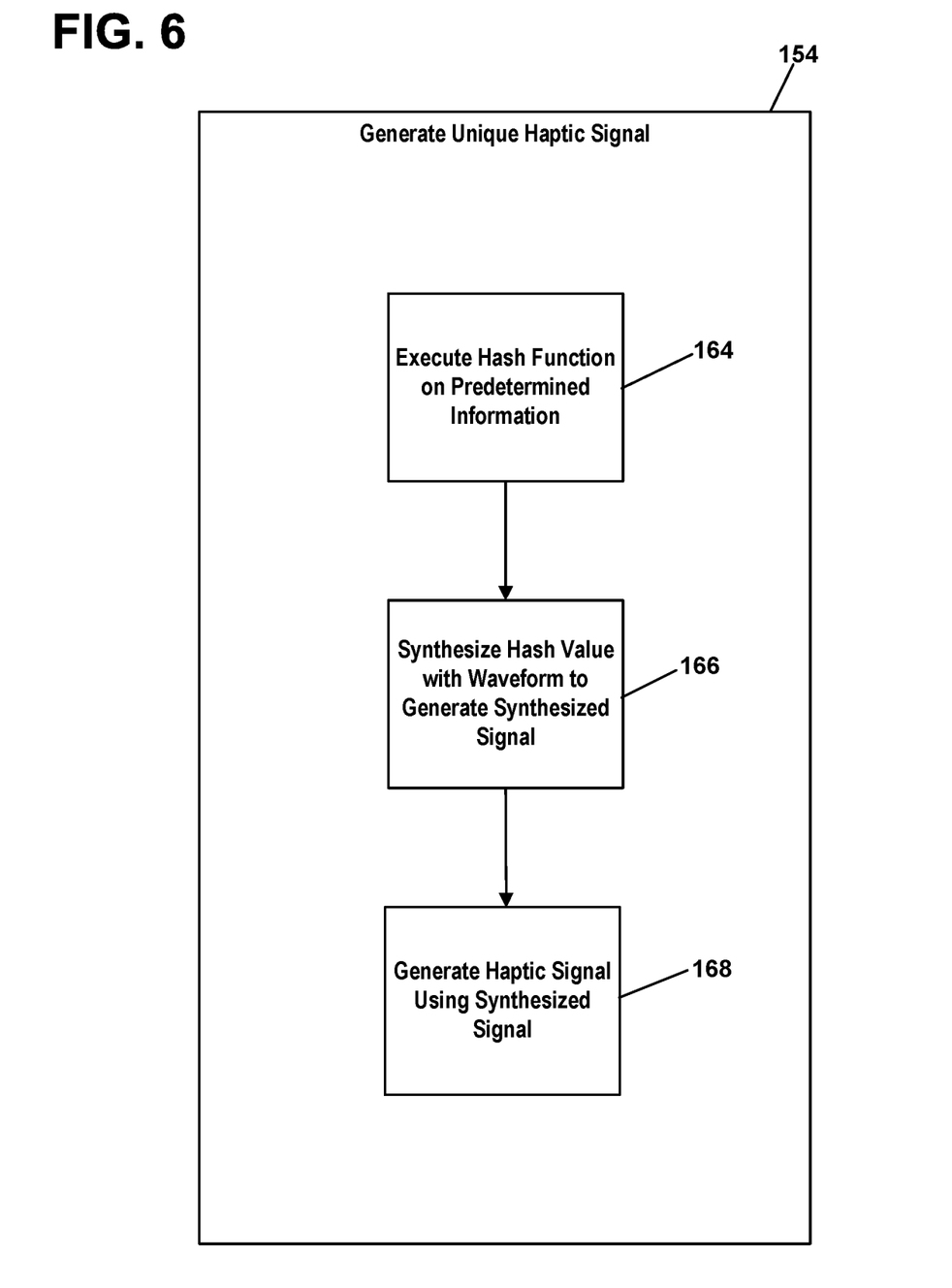

FIG. 6 illustrates one possible embodiment of Operation 154 for processing the predetermined information to generate a unique haptic signal. In this embodiment, the hash function is executed on the predetermined information to generate a hash value. Operation 164. The hash value is then synthesized with a waveform to form a synthesized signal. Operation 166. The waveform synthesized with the hash value is a digital representation of any suitable periodic waveform such a sinusoidal wave. Additionally the waveform synthesized with the hash function can be a superimposition of multiple waveforms and can have varying parameters such as a varying frequency or amplitude. The synthesized signal is processed by the haptic control module 134 to generate a haptic signal. Operation 168. The haptic signal is then communicated to the actuator drive circuit 114 wherein it is converted to an analog signal and conditioned to generate a drive signal. The drive signal is applied to the haptic actuator 102. Operation 156. Alternatively, the synthesized signal forms the haptic signal itself and is communicated directly to the actuator drive circuit 114. Upon application of the drive signal to the haptic actuator 102, the haptic actuator 102 will generate the haptic effect. Operation 156.

Figure 7:
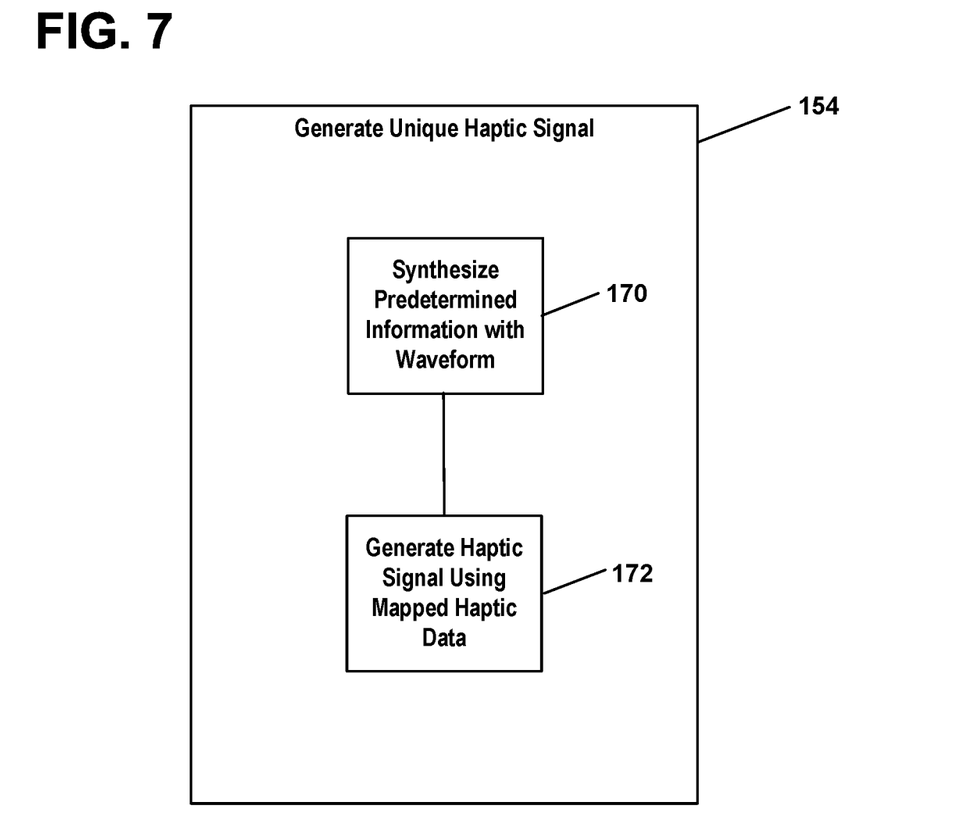

FIG. 7 illustrates another possible embodiment of Operation 154 for processing the predetermined information to generate a unique haptic signal. In this embodiment, a digital representation of the information is directly synthesized with a waveform to form the synthesized signal. The synthesized signal is processed by the haptic control module 134 to generate a haptic signal. Operation 172. The haptic signal is then communicated to the actuator drive circuit 114 wherein it is converted to an analog signal and conditioned to generate a drive signal. Operation 174. The drive signal is applied to the haptic actuator 102. Operation 156. Alternatively, the synthesized signal forms the haptic signal itself and is communicated directly to the actuator drive circuit 114. Upon application of the drive signal to the haptic actuator 102, the haptic actuator 102 will generate the haptic effect. Operation 156.

Figure 8:
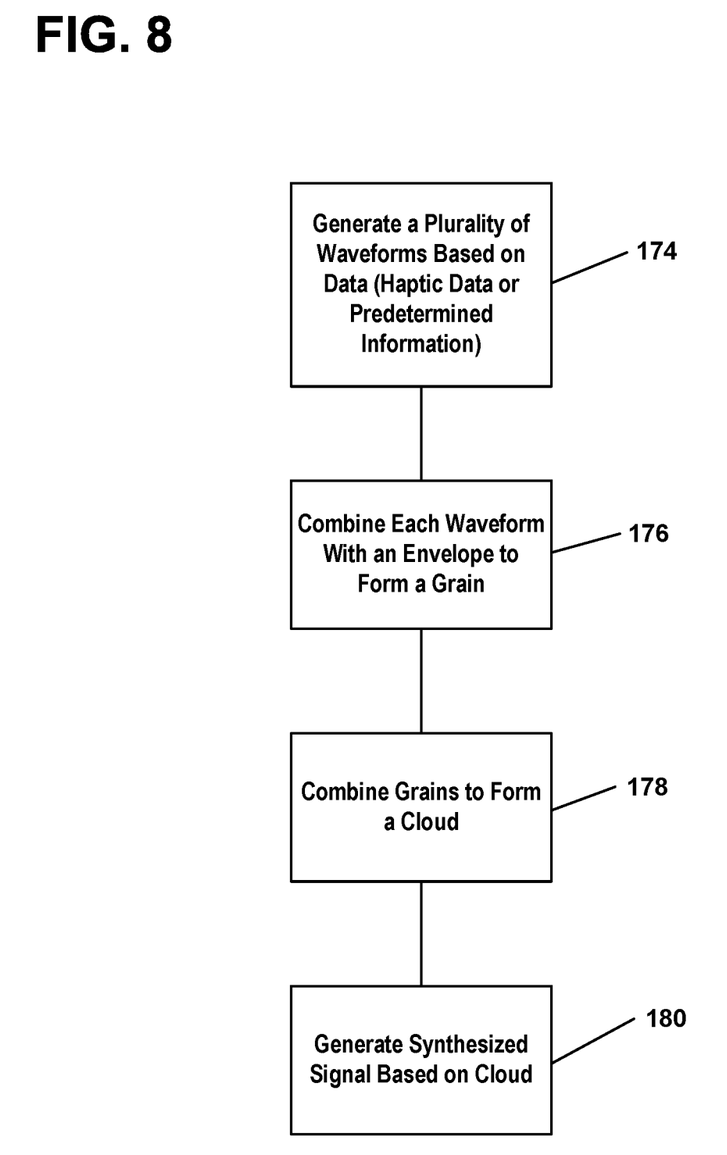

Synthesizing the hash value or information with a waveform can use any suitable technique or process for synthesizing signals. In at least some possible embodiments, the granular synthesis is used to synthesize the hash value or information to a waveform. Referring now to FIG. 8, a possible process of granular synthesis of a hash value or information to a wave form includes generating a plurality of waveforms based on the hash data or predetermined information, and on any other predefined signal parameters. Operation 174. Each waveform is combined with an envelope to generate a grain, thereby generating a plurality of grains. Operation 176. The grains are combined to generate a cloud, which is a spatial representation of multiple grains over time. Operation 178. A synthesized signal is generated based on the cloud. Operation 180. The haptic control module 134 then processes the synthesized signal to form a haptic signal, which is then communicated to the actuator control circuit for processing into a drive signal for controlling the haptic actuator 102. Granular synthesis of data to generate a haptic signal is described in more detail in U.S. Pat. No. 8,860,563, issued on Oct. 14, 2014 and entitled, Haptic Effect Conversion System Using Granular Synthesis, the entire disclosure of which is hereby incorporated by reference.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A haptic-enabled apparatus, comprising:
   a haptic actuator;
   a memory storing a hash function; and
   a controller, communicatively coupled to the haptic actuator and the memory, configured to:
   receive a plurality of information items,
   execute the hash function on the plurality of information items to generate a different hash value for each information item,
   synthesize at least two hash values with a digital signal to generate a haptic signal, and
   apply the haptic signal to the haptic actuator to generate a haptic effect associated with the haptic signal.

2. The haptic-enabled apparatus of claim 1, wherein the plurality of information items are selected from the group consisting of a message, an identifier, metadata, an image, a video signal, and an audio signal.

3. The haptic-enabled apparatus of claim 1, wherein the plurality of information items are selected from the group consisting of a name, a telephone number, and an address.

4. The haptic-enabled apparatus of claim 1, wherein the controller is further configured to execute the hash function on the plurality of information items in real time.

5. The haptic-enabled apparatus of claim 1, wherein the controller is configured to determine if the plurality of information items includes a predetermined information item.

6. The haptic-enabled apparatus of claim 1, wherein the controller is configured to synthesize the hash values with the digital signal using granular synthesis.

7. The haptic-enabled apparatus of claim 1, wherein the digital signal is a predetermined digital signal stored in the memory.

8. The haptic-enabled apparatus of claim 7, wherein the predetermined digital signal corresponds to a periodic signal.

9. The haptic-enabled apparatus of claim 1, wherein the controller forms the haptic signal in real time upon receiving the plurality of information items.

10. The haptic-enabled apparatus of claim 1, wherein the hash function generates different hash values having the same number of digits.

11. The haptic-enabled apparatus of claim 1, wherein, when the hash function generates the same hash value for different information items, the controller is configured to execute a collision avoidance process.

12. A method of automatically generating a haptic effect in a programmable apparatus, the programmable apparatus including a haptic actuator, a memory and a controller, the method comprising:
   receiving a plurality of information items;
   executing a hash function on the plurality of information items to generate a different hash value for each information item;
   synthesizing at least two hash values with a digital signal to generate a haptic signal; and
   applying the haptic signal to the haptic actuator to generate a haptic effect associated with the haptic signal.

13. The method of claim 12, wherein the plurality of information items are selected from the group consisting of a message, an identifier, metadata, an image, a video signal, an audio signal, a name, a telephone number, and an address.

14. The method of claim 12, wherein executing the hash function and synthesizing the hash values with the digital signal to generate the haptic signal are performed in real time upon the controller receiving the plurality of information items.

15. The method of claim 12, wherein synthesizing the hash values with the digital signal uses granular synthesis.

16. The method of claim 12, wherein the digital signal is a predetermined signal stored in the memory.

17. The method of claim 12, wherein the hash function generates different hash values having the same number of digits.

18. The method of claim 12, wherein, when the hash function generates the same hash value for different information items, the method further comprises executing a collision avoidance process.

* * * * *